United States Patent Office 3,798,213
Patented Mar. 19, 1974

3,798,213
7α-METHYL-20-SPIROXANE-3-ONES
AND PROCESS
Glen E. Arth, Cranford, N.J., assignor to Merck & Co.,
Inc., Rahway, N.J.
No Drawing. Filed Jan. 25, 1971, Ser. No. 109,677
Int. Cl. C07c *173/00*
U.S. Cl. 260—239.55 R                 11 Claims

ABSTRACT OF THE DISCLOSURE

The invention disclosed herein relates to novel ring A unsaturated 7α-methyl-20-spiroxane-3-one compounds including 7α-methyl-20-spirox-4-ene-3-ones and their 19-nor and 19-nor-18-methyl derivatives, and $\Delta^{5(10)}$, $\Delta^{1,4}$, $\Delta^{4,9(10)}$ and $\Delta^{4,9(10),11}$ analogs thereof; and to processes for preparing these compounds from the corresponding 20-spiroxa-4,6-diene-3-one compound. These new ring A unsaturated 7α-methyl-20-spiroxane-3 one compounds are potent anti-estrogens, possess effective anti-implantation activity, and are useful in fertility control.

This invention relates to novel ring A unsaturated 7α-methyl-20-spiroxane-3-one compounds, and to novel processes and intermediate compounds useful for their preparation. These new ring A unsaturated 7α-methyl-20-spiroxane-3-ones, and particularly the 7α-methyl 20-spirox-4-ene-3-ones, their 19-nor and 19-nor-18-methyl derivatives, and $\Delta^{5(10)}$, $\Delta^{1,4}$, $\Delta^{4,9(10)}$ and $\Delta^{4,9(10),11}$ analogs thereof, possess valuable anti-estrogenic and anti-implantation activity.

The novel ring A unsaturated 7α-methyl-20-spiroxane-3-one compounds of this invention may be represented by the following structural formula:

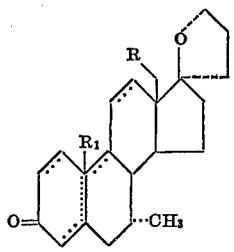

wherein $R_1$ and R are hydrogen or methyl, and the dotted lines at the 2, 4, 5, 9 and 11 positions indicate the optional presence of a double bond at one or more of these positions, e.g. $\Delta^4$, $\Delta^{5(10)}$, $\Delta^{1,4}$, $\Delta^{4,9(10)}$ or $\Delta^{4,9(10),11}$.

These ring A unsaturated 7α-methyl-20-spiroxane-3-one compounds are conveniently prepared starting with the corresponding 20-spiroxa-4,6-diene - 3 - one compound, which may be represented by the following structural formula:

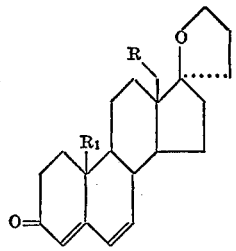

wherein R and $R_1$ are hydrogen or methyl. In the case where R is hydrogen and $R_1$ is methyl, the 20-spiroxa-4,6-diene-3-one (Compound 1 hereinbelow) is ordinarily reacted with methyl magnesium iodide in ether solution, preferably at a low temperature of about 0° C. The Grignard intermediate is conveniently decomposed by admixture with aqueous acid; the product is recovered by extraction with ether, and purified by chromatography to give 7α-methyl-20-spirox-4-ene-3-one (Compound 2). This compound may then be reacted with dichlorodicyanobenzoquinone, preferably by heating the reactants together in dioxane under reflux, under which conditions the reaction is ordinarily complete in about 3 hours. The reaction mixture is filtered thereby removing unwanted by-products, the solvent is evaporated, and the residual oil is purified by chromatography to give 7α-methyl-20-spiroxa-1,4-diene-3-one (Compound 3).

The corresponding 19-nor analogs are conveniently prepared starting with the aforesaid Compound 3 in accordance with the following procedure: a tetrahydrofuran solution containing 7α-methyl-20-spiroxa-1,4-diene-3-one, diphenyl methane and biphenyl lithium is heated under reflux, the reaction mixture is treated with aqueous ammonium chloride thereby decomposing unreacted lithium, and the resulting aqueous mixture is extracted with benzene. The benzene extract is then evaporated to give 7α-methyl-19-nor-20-spiroxa - 1,3,5(10) - triene-3-ol (Compound 4). This 20-spiroxa-1,3,5(10)-triene-3-ol is then reacted with methyl iodide in acetone solution in the presence of anhydrous potassium carbonate thereby forming the corresponding 3-methyl ether, 3-methoxy-7α-methyl-19-nor-20-spiroxa-1,3,5(10)-triene (Compound 5). The latter compound is subjected to the action of metallic lithium in liquid ammonia-butanol-ether solution, which reaction is ordinarily conducted at the boiling point of the mixture for a period of approximately five hours. Methanol is added to the reaction mixture thereby decomposing unreacted lithium, the ammonia is allowed to evaporate, and the residual material is shaken with a mixture of water and ether. The ethereal layer is separated, washed with water, and dried, and the ether is evaporated to give 3-methoxy-7α-methyl-19-nor - 20 - spiroxa-2,5(10)-diene (Compound 6). This 3 - methoxy-7α-methyl-19-nor-20-spiroxa-2,5(10)-diene is reacted with oxalic acid in aqueous acetone solution to give 7α-methyl-19-nor-20-spirox-5(10)-ene-3-one (Compound 7) which, upon reaction with pyridine and bromine, is converted to 7α-methyl-19-nor-20-spiroxa-4,9(10)-diene-3-one (Compound 8).

Alternatively, the 7α-methyl-19-nor-spirox-5(10)-ene-3-one or the 3-methoxy - 7α - methyl-19-nor-20-spiroxa-2,5(10)-diene is reacted with aqueous mineral acid solution, preferably aqueous hydrochloric acid solution, thereby forming 7α-methyl-19-nor-20-spirox-4-ene-3-one (Compound 9).

The foregoing reactions may be structurally represented as follows:

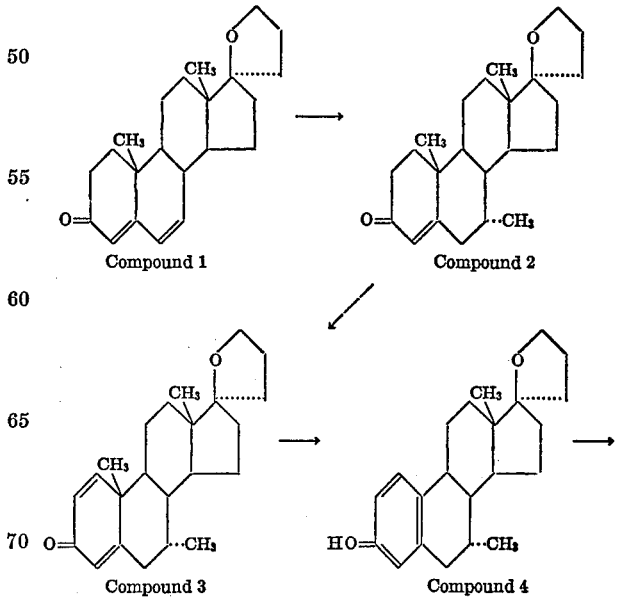

Compound 1     Compound 2

Compound 3     Compound 4

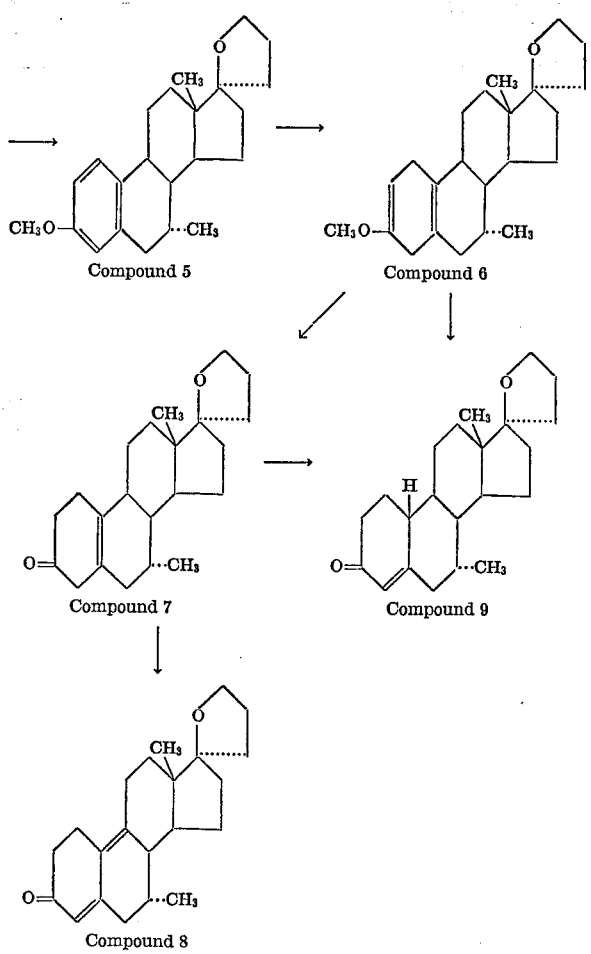

Compound 5

Compound 6

Compound 7

Compound 9

Compound 8

This 7α-methyl-19-nor-20-spirox-4-ene-3-one, as well as the corresponding 18-methyl derivative (Compound 9), may also be prepared by reacting the corresponding 7-desmethyl compound, 19-nor-20-spirox-4-ene-3-one or its 18-methyl derivative (Compound 10) with a strong acid enolizing agent such as 2,4-dinitrobenzene sulfonic acid, which reaction is conveniently conducted by bringing the reactants together in solution in an alcoholic solvent under anhydrous conditions, for example anhydrous methanol in the presence of trimethylorthoformate, thereby converting said 19-nor-20-spirox-4-ene-3-one or its 18-methyl derivative to the corresponding enol alcoholate, 3-methoxy - 19-nor-20-spiroza-3,5-diene or 3-methoxy-18-methyl-19-nor-20-spiroza-3,5-diene (Compound 11). The latter compound is then reacted with an oxidizing agent such as chloranil, which reaction is conveniently conducted by dissolving the 3-methoxy-19-nor-20-spiroxa-3,5-diene or its 18-methyl derivative in alcoholic solvent such as isopropanol and treating the resulting solution with chloranil, preferably at room temperature, under which conditions the oxidation reaction is ordinarily complete in about 2–3 hours. The steroid product is conveniently recovered from the reaction mixture by filtering the unreacted chloranil, evaporating the filtered alcoholic solution, and shaking the residual material with ether in the presence of aqueous sodium bisulfite solution, thereby reducing any residual chloranil contaminant, and then with an aqueous alkaline solution thereby removing acidic by-products. The ethereal extract is subjected to chromatography, utilizing ether as both the developing and eluting solvents to give 19-nor-20-spiroxa-4,6-diene-3-one or its 18-methyl derivative (Compound 12). This 19-nor-20 - spiroxa - 4,6 - diene-3-one or 18-methyl-19-nor-20-spiroxa-4,6-diene-3-one is then reacted with methyl magnesium iodide in ether solution, preferably at a low temperature of about 0° C. and the resulting Grignard intermediate decomposed by admixture with aqueous acid. The steroid product is recovered by extraction with ether and purified by chromatography to give 7α-methyl-19-nor-20-spirox-4-ene-3-one or 7α,18-dimethyl-19-nor-20-spirox-4-ene-3-one (Compound 9).

The foregoing reactions may be structurally represented as follows, R being hydrogen or methyl:

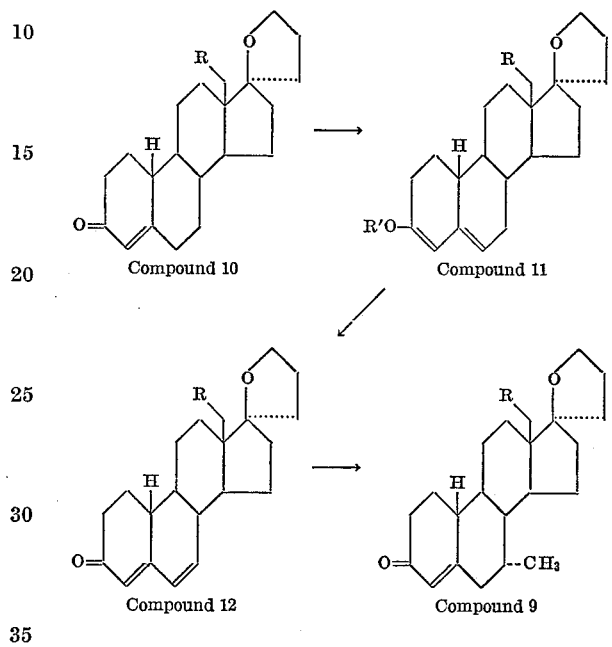

Compound 10

Compound 11

Compound 12

Compound 9

When R is methyl and $R_1$ is hydrogen in the 7α-methyl-20-spiroxane-3-one represented by the formula on page 3 hereinabove, the 20-spiroxa-4,6-diene-3-one used as starting material is conveniently prepared as follows: 18-methyl-estrone methyl ether, which may also be referred to as 3 - methoxy-13-ethyl-gona-1,3,5(10)-triene-17-one (Compound 13 hereinbelow) is reacted with an allyl magnesium halide, preferably allyl magnesiumchloride in tetrahydrofuran solution at about room temperature, and the Grignard intermediate decomposed by admixture with aqueous ammonium chloride solution. The aqueous mixture is then extracted with ethyl acetate, and the ethyl acetate extract dried and evaporated, and the residual material purified by chromatography to give 3-methoxy-13-ethyl - 17α-allyl-gona-1,3,5(10)-triene-17β-ol (Compound 14).

A mixture of 3-methyl-2-butene, sodium borohydride, and tetrahydrofuran is reacted in a nitrogen atmosphere with boron trifluoride-etherate, first at a temperature of about —5° C. and then at about 25° C. thereby forming a reaction mixture containing bis (3-methyl-2-butyl)-borohydride. The reaction mixture is then reacted with the 3 - methoxy-13-ethyl-17α-allyl-gona-1,35(10)-triene-17β-ol in tetrahydrofuran, first at a temperature of about —15° C., then at about 0° C., and finally at 25° C. for about 15 hours, to form the trialkyl-borane intermediate, 3 - methoxy - 13 - ethyl-17α-{3'-[bis-(3-methyl-2-butyl)-boryl]-propyl}-gona-1,3,5(10)-triene-17β-ol, which, upon treatment with alkaline hydrogen peroxide solution is converted to the corresponding 17α - (3' - hydroxypropyl) derivative. Aqueous sodium bisulfite is then added thereby decomposing excess hydrogen peroxide, the reaction mixture is extracted with chloroform, the chloroform extract is dried and evaporated, and the residual material purified by chromatography to give 3-methoxy-13-ethyl-17α(3'-hydroxypropyl)-gona - 1,3,5(10)-triene-17β-ol (Compound 15). The latter compound is then cyclized by reaction with a dehydrating agent, preferably p-toluene-sulfonyl chloride in pyridine, thereby forming 3-methoxy-18-methyl-10-nor-20-spiroxa-1,3,5(10)-triene (Compound 16).

The foregoing reactions may be structurally represented as follows:

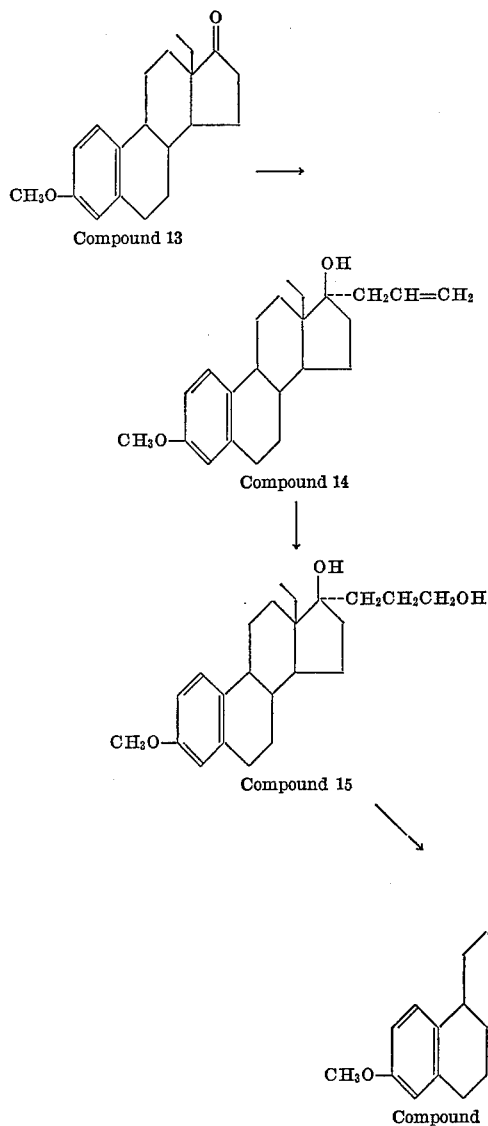

This 3-methoxy-18-methyl-19-nor-20-spiroxa-1,3,5(10)-triene is reacted with metallic lithium in liquid ammonia-butanol-ether solution, which reaction is ordinarily conducted at the boiling point of the mixture for a period of about 5 hours. Methanol is added to the reaction mixture, thereby decomposing unreacted lithium, the ammonia is allowed to evaporate, and the residual material is shaken with ether and water. The ether layer is separated, washed with saturated aqueous sodium chloride solution, dried, and the ether evaporated to give 3-methoxy-18-methyl-19-nor-20-spiroxa - 2,5(10) - diene (Compound 17) which, upon reaction with oxalic acid in aqueous methanol solution, is converted to 18-methyl-19-nor-20 - spirox - 5(10)-ene-3-one (Compound 18). This 18-methyl-19-nor - 20-spirox-5(10)-ene-3-one or the 3-methoxy-18-methyl-19-nor-20 - spiroxa - 2,5(10) - diene is reacted with aqueous mineral acid solution, preferably aqueous ethanolic hydrochloric acid solution; the reaction mixture is neutralized with an aqueous alkaline solution, the ethanol is evaporated, and the aqueous mixture is extracted with ether. The ether extract is washed with water, dried, and evaporated and the residual material is purified by chromatography to give 18-methyl-19-nor-20-spirox-4-ene - 3 - one (Compound 19).

This 18-methyl-19-nor-20-spirox-4-ene-3-one is reacted with a strong acid enolizing agent, such as 2,4-dinitro- benzenesulfonic acid, which reaction is conveniently conducted by bringing the reactants together in anhydrous alcohol, for example anhydrous methanol in the presence of trimethyl orthoformate, thereby forming 18-methyl-3-methoxy-19-nor-20-spiroxa - 3,5 - diene (Compound 20). The latter compound is reacted with an oxidizing agent, such as chloranil, preferably in a lower alkanol such as isopropanol at about room temperature, under which conditions the reaction is substantially complete in about 2–3 hours. The reaction mixture is filtered, isopropanol is evaporated from the filtered solution, and the residual material is shaken with a mixture of ether and aqueous sodium bisulfite solution, thereby reducing residual chloranil; the ether solution is separated, washed with aqueous alkaline solution, evaporated, and the residual material subjected to chromatography to give 18-methyl-19-nor-20-spiroxa-4,6-diene-3-one (Compound 21).

The foregoing reactions may be structurally represented as follows:

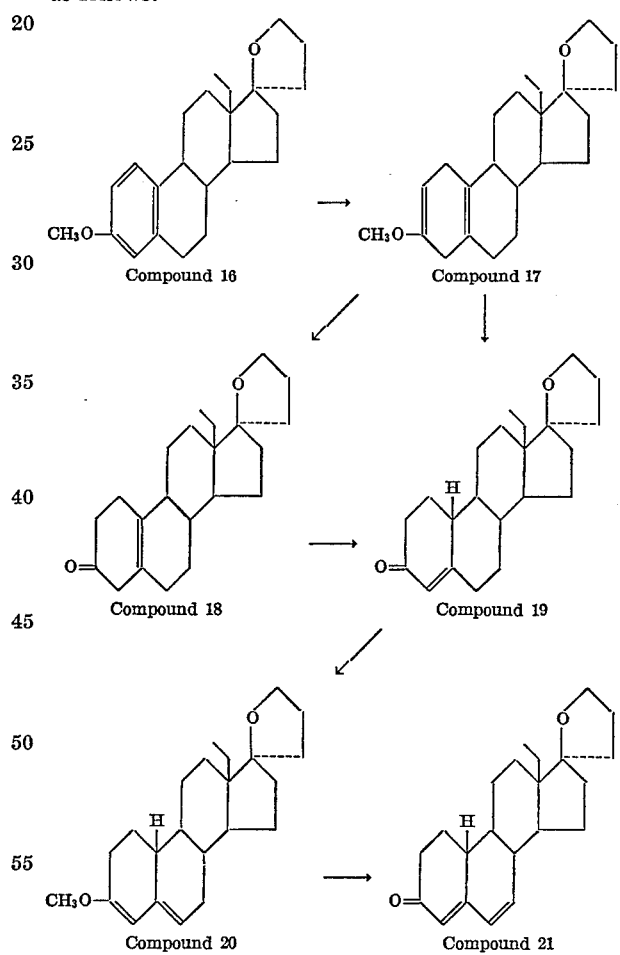

This 18-methyl-19-nor-20-spiroxa-4,6-diene - 3 - one is then reacted with methyl magnesium iodide in ether solution, in accordance with the procedure more fully described hereinabove for treating the corresponding 19-nor-20-spiroxa-4,6-diene-3-one, to give 7α-,18-dimethyl - 19-nor-20-spirox-4-ene - 3 - one (Compound 22). The latter compound is then reacted with ethylene glycol in the presence of an acidic catalyst, such as p-toluene sulfonic acid. The reaction is conveniently conducted by heating the reactants together in benzene solution under reflux for a period of about 15–20 hours; the benzene reaction mixture is washed with aqueous alkaline solution, with water, dried, the benzene evaporated, and the residual material chromatographed to give 3-ethylenedioxy-7α,18-dimethyl-19-nor-20-spirox-5(10)-ene (Compound 23). The latter compound is reacted with oxalic acid in aqueous acetone solution to form 7α,18-dimethyl-19-nor-20-spirox-5(10)-ene-3-one which is then reacted with pyridine and bromide to produce 7α,18-dimethyl-19-nor-20 - spiroxa - 4,9(10)-diene-3-one (Compound 24). The 7α,18-dimethyl-19-nor-20-spiroxa-4,9(10)-diene-3-one is reacted with methanol in the presence of an acidic enolizing agent such as 2,4-dinitrobenzene sulfonic acid to form 3,3-dimethoxy-7α, 18-dimethyl-19-nor-20-spiroxa-5(10),9(11) - diene (Compound 25). The last-named compound is reacted with oxalic acid in aqueous methanol solution thereby forming 7α,18-dimethyl-19-nor-20-spiroxa-5(10,9(11) - diene - 3-one which is, in turn, reacted with a strong oxidizing agent, such as dichlorodicyanobenzoquinone, and the like. Where dichlorodicyanobenzoquinone is used as the oxidizing agent, the reaction is conveniently conducted by bringing the reactants together in benzene solution at a temperature of about 25° C., under which conditions the oxidation is ordinarily substantially complete in about two hours. The reaction mixture is extracted with a water-immiscible organic solvent, such as methylene chloride, ethyl acetate, and the like; the organic solvent layer is washed with an aqueous alkaline solution, then with water, dried, the organic solvent evaporated, and the residual material is purified by chromatography to give 7α,18-dimethyl-19-nor-20-spiroxa - 4,9(10),11 - triene-3-one (Compound 26).

The foregoing reactions may be structurally represented as follows:

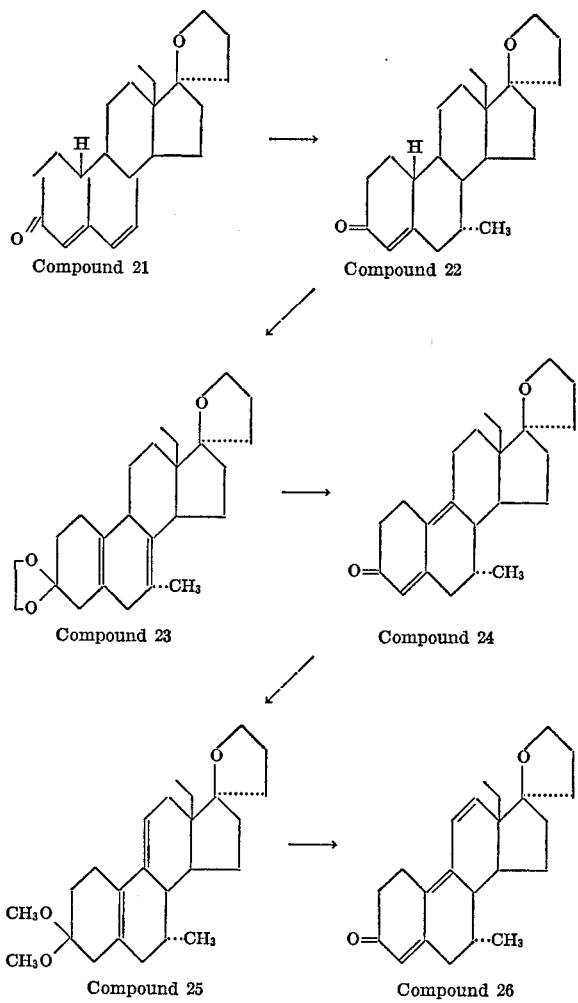

Compound 21     Compound 22

Compound 23     Compound 24

Compound 25     Compound 26

The following examples illustrate methods of carrying out the present invention, but it is to be understood that these examples are given for purposes of illustration and not of limitation:

EXAMPLE 1

Approximately 1.79 g. of magnesium turnings is reacted under a nitrogen atmosphere with excess methyl iodide in 200 ml. of ether to form an ether solution of methyl magnesium iodide. About 85 ml. of ether is distilled to remove excess methyl iodide; 920 mg. of dry cuprous chloride is then added, and the resulting mixture is cooled with stirring to 0° C. and maintained at that temperature for a period of about 10 minutes. A solution of 8.0 g. of 20-spiroxa-4,6-diene-3-one in 150 ml. of ether is added, with stirring over a period of about 100 minutes, to the ethereal solution of Grignard reagent. The mixture is stirred for an additional thirty minute period, and a saturated aqueous solution of ammonium chloride is then added to the reaction mixture. The aqueous mixture is diluted with 200 ml. of water and 200 ml. of ether, and the aqueous layer is discarded. The ethereal layer is washed well with water, dried, and the ether evaporated. The residual oil is dissolved in 50 ml. of ethanol, admixed with 5 ml. of 2.5 N aqueous hydrochloric acid solution, and heated under reflux for a period of 10 minutes. The ethanolic solution is cooled, diluted with 200 ml. of water, and excess sodium bicarbonate solution is added. The aqueous alkaline solution is extracted with two 200 ml.-portions of a 1:1 mixture of ether-petroleum ether. The extracts are combined and evaporated in vacuo, and the residual oil is dissolved in 25 ml. hexane containing sufficient benzene to effect solution, and the resulting solution is chromatographed on an alkaline alumina column. The initial eluates (using 9:1 petroleum ether-ether) are discarded; evaporation of the 8:2 petroleum ether-ether eluates gives approximately 3.25 g. of an oil which crystallizes from methanol; upon recrystallization from methanol there is obtained substantially pure α-methyl-20-spirox-4-ene-3-one; M.P. 107–109° C; $\lambda_{max}$ 242.5 m$\mu$, $\epsilon$, percent, 461.

EXAMPLE 2

A mixture of 3 g. of 7α-methyl-20-spirox-4-ene-3-one, 50 ml. of dioxane and 2.5 g. of dichlorodicyanobenzoquinone is heated at reflux in a nitrogen atmosphere for a period of approximately 3 hours. The reaction mixture is cooled and the crystalline material which precipitates is recovered by filtration, washed with ethyl acetate, and discarded. The filtrate and ethyl acetate washings are evaporated in vacuo, and the residual oil is dissolved in 50 ml. of petroleum ether by the addition of a few mls. of benzene, and the resulting solution is chromatographed on an alkaline alumina column wet-packed with petroleum ether. The column is eluted succesively with petroleum ether; with a 9:1 petroleum ether-ether mixture; and finally with a 8:2 petroleum ether-ether mixture. The latter eluate is evaporated and the residual material recrystallized from hexane to give substantially pure 7α-methyl-20-spiroxa-1,4-diene-3-one; M.P. 115–117° C.

EXAMPLE 3

Approximately 200 mg. of lithium wire is added portionwise, in 0.5 cm. lengths, to 2 g. of biphenyl and 20 ml. of absolute tetrahydrofuran, while maintaining the reaction mixture under a dry nitrogen atmosphere. A blue color slowly appears and, after about one-half hour, the lithium is substantially all dissolved. To this mixture at room temperature is added a solution of 0.6 ml. of diphenylmethane and 1.0 g. of 7α-methyl-20 - spirox - 1,4-diene-3-one in 10 ml. of absolute tetrahydrofuran, and the resulting mixture is stirred under reflux in a nitrogen atmosphere for a period of about one hour. The reaction mixture is then cooled to about 0° C., approximately 2 g. of powdered ammonium chloride is added, followed by 50 ml. of water and 50 ml. of benzene, and the organic layer is separated. The aqueous layer is reextracted with 50 ml. of benzene. The combined organic layers are washed well with water, dried, and the solvents evaporated in vacuo to give 7α-methyl-19-nor-20-spiroxa-1,3,5-(10)-triene-3-ol in the form of an oil.

This oil is dissolved in a mixture of 30 ml. of anhydrous acetone, and 5 ml. of methyl iodide and five grams of powdered anhydrous potassium carbonate is added, and the resulting mixture is stirred at room temperature in a sealed flask for a period of about 15 hours. The inorganic material is separated by filtration, washed thoroughly with acetone, and the filtered reaction solution is evaporated to an oil in vacuo. The residual oil is dissolved in 50 ml. of petroleum ether containing a few milliliters of benzene. This solution is then chromatographed on an alkaline alumina column wet-packed with petroleum ether. The column is eluted, first with petroleum ether (which eluate contains biphenyl and diphenylmethane), and then with petroleum ether:ether mixtures. Evaporation of the 9:1 and 8:2 petroleum ether-ether eluates, and recrystallization of the residual material from methanol gives substantially pure 3 - methoxy-7α-methyl-19-nor-20-spiroxa-1,3,5(10)-triene; M.P. 93–95° C.

EXAMPLE 4

Approximately 150 ml. of anhydrous liquid ammonia is added with stirring to a mixture of 2.0 g. of 3-methoxy-7α-methyl-19-nor-20-spiroxa-1,3,5(10)-triene, 50 ml. of t-butanol and 150 ml. of ether, while maintaining the temperature of the reactants at about −80° C.; this temperature is then increased to the boiling point of the mixture, and maintained at that temperature by means of a Dry-Ice condenser, while adding thereto about 0.5 g. of lithium wire portionwise in 0.5 cm. lengths over a 10 minute period; the lithium-ammonia deep blue color persists over a 5 hour period. Approximately 35 ml. of methanol is then added cautiously, whereupon the blue color disappears and the unreacted lithium goes into solution. The ammonia is allowed to evaporate overnight. Two hundred milliliters of water and 200 ml. of ether are added, and the layers separated. The aqueous layer is reextracted with another 200 ml.-portion of ether. The combined ether extracts are then washed with three 50 ml.-portions of saturated aqueous sodium chloride solution, dried, and the ether evaporated. The residual oil is crystallized from methanol to give 3-methoxy-7α-methyl-19-nor-20-spiroxa-2,5(10)-diene having characteristic infra-red absorption bands at 5.90 and 6.0μ.

EXAMPLE 5

A solution of 1 g. of crystalline 3-methoxy-7α-methyl-19-nor-20-spiroxa-2,5(10)-diene in 25 ml. of a 9:1 acetone-water mixture is acidified with 500 mg. of oxalic acid. The resulting mixture is stirred at room temperature for three hours, 50 ml. of water is added (whereupon the steroid product precipitates), and the resulting aqueous mixture is extracted with ether. The ethereal extract is washed with saturated aqueous sodium bicarbonate solution, then with water, dried, and the ether evaporated. The residual oil is crystallized from methanol to give 7α-methyl-19-nor-20-spirox-5(10)-ene-3-one having a characteristic infra-red absorption band at 5.84μ.

EXAMPLE 6

A solution of 1 g. of 3-methoxy-7α-methyl-19-nor-20-spiroxa-2,5(10)-diene in 25 ml. of ethanol containing 6 ml. of 2.5 N aqueous hydrochloric acid is heated at reflux temperature for a period of about 15 minutes. The reaction mixture is cooled, diluted with 50 ml. of water, neutralized with solid sodium bicarbonate, and the ethanol evaporated. The aqueous mixture is then extracted with ether; the ethereal extract is washed with water, dried, and evaporated. The residual oil is dissolved in 50 ml. of petroleum ether containing a few milliliters of benzene. This solution is chromatographed on an alkaline alumina column wet-packed with petroleum ether. The column is then eluted, first with petroleum ether, and then with petroleum ether:ether mixtures; the combined 9:1 and 8:2 petroleum ether-ether eluates are evaporated, and the residual material crystallized from petroleum ether to give substantially pure 7α-methyl-19-nor-20-spirox-4-ene-3-one; M.P. 104–106° C.;

$$\lambda_{max}^{methanol}\ 241$$

ε, percent, 523.

EXAMPLE 7

A solution of 1 g. of 7α-methyl-19-nor-20-spirox-5(10)-ene-3-one in 25 ml. of ethanol containing 6 ml. of 2.5 N aqueous hydrochloric acid is heated at reflux temperature for a period of about 15 minutes. The reaction mixture is cooled, diluted with 50 ml. of water, neutralized with solid sodium bicarbonate, and the ethanol evaporated. The aqueous mixture is then extracted with ether; the ethereal extract is washed with water, dried, and evaporated. The residual oil is dissolved in 50 ml. of petroleum ether containing a few milliliters of benzene. This solution is chromatographed on an alkaline alumina column wet-packed with petroleum ether. The column is then eluted, first with petroleum ether, and then with petroleum ether:ether mixtures; the combined 9:1 and 8:2 petroleum ether-ether eluates are evaporated, and the residual material crystallized from petroleum ether to give substantially pure 7α-methyl-19-nor-20-spirox-4-ene-3-one; M.P. 104–106° C.;

$$\lambda_{max}^{methanol}\ 241$$

ε, percent, 523.

EXAMPLE 8

To a solution of 520 mg. of 19-nor-20-spirox-4-en-3-one and 1 ml. of trimethyl orthoformate in 10 ml. of anhydrous methanol, cooled to 0° C., is added 50 mg. of 2,4-dinitrobenzenesulfonic acid. The reaction mixture is maintained at 0° C. for a period of about 5 minutes. Two drops of pyridine are added and then, dropwise at room temperature, 20 ml. of water. The crystalline material which separates is recovered by filtration, washed well with water, dried, and recrystallized from petroleum ether to give 3-methoxy-19-nor-20-spiroxa-3,5-diene.

This 3-methoxy-19-nor - 20 - spiroxa-3,5-diene is dissolved in a mixture of 12 ml. of isopropanol (reagent grade containing 0.25% water) and 0.035 ml. of water. About 1.1 g. of chloranil is added, and the resulting mixture is stirred at room temperature for about 2.5 hours. The reaction mixture is cooled and filtered thereby removing undissolved, unreacted chloranil. The insoluble material is washed with two 5 ml.-portions of isopropanol, and the combined filtrates are evaporated to dryness. The residual material is dissolved in ether, and the ethereal solution is extracted first with saturated aqueous sodium bisulfite solution, then with 1 M. aqueous sodium hydroxide solution, and finally with three portions of water. The aqueous solutions are back-extracted with ether, the ethereal solutions are combined and re-extracted with the aqueous solvents as before. The combined ether extracts are dried, and evaporated to a volume of about 5 ml. This concentrated ether solution is passed over 7 g. of acid-washed alumina previously wet-packed with petroleum ether. The column is then eluted with ether, the ether eluate is evaporated to dryness, and the residual material is recrystallized from hexane containing a few percent of ethyl acetate to give 19-nor-20-spiroxa-4,6-diene-3-one; M.P. 159–161° C.;

$$\lambda_{max}^{methanol}\ 284$$

ε, percent, 848.

Approximately 90 mg. of magnesium turnings is reacted under a nitrogen atmosphere with excess methyl iodide in 10 ml. of ether to form an ether solution of methyl magnesium iodide. About 4 ml. of ether is distilled to remove excess methyl iodide; 46 mg. of dry cuprous chloride is then added, and the resulting mixture is cooled with stirring to 0° C. and maintained at that temperature for a period of about 10 minutes. A solution of 400 mg. of 10-nor-20-spirox-4,6-diene-3-one in 7.5 ml. of ether is added, with stirring over a period of about 100 minutes, to the ethereal solution of Grignard reagent. The mixture is stirred for an additional thirty minute period, and a saturated aqueous solution of ammonium chloride is then added to the reaction mixture. The aqueous mixture is diluted with 10 ml. of water and 10 ml. of ether, and the aqueous layer is discarded. The ethereal layer is washed well with water, dried, and the ether evaporated. The residual oil is dissolved in 2.5 ml. of ethanol, admixed with 5 ml. of 2.5 N aqueous hydrochloric acid solution, and heated under reflux for a period of 10 minutes. The ethanolic solution is cooled, diluted with 10 ml. of water, and excess sodium bicarbonate solution is added. The aqueous alkaline solution is extracted with two 10 ml.-portions of a 1:1 mixture of ether-petroleum ether. The extracts are combined and evaporated in vacuo, and the residual oil is dissolved in 1.5 ml. hexane containing sufficient benzene to effect solution, and the resulting solution is chromatographed on an alkaline alumina column. The initial eluates (using 9:1 petroleum ether-ether) are discarded; evaporation of the 8:2 petroleum ether-ether eluates gives approximately 160 mg. of an oil which crystallizes from methanol; upon recrystallization from methanol there is obtained substantially pure 7α-methyl-19-nor-20-spirox-4-ene-3-one.

EXAMPLE 9

A solution of about 20 g. of 18-methyl-estrone methyl ether in 200 ml. of dry tetrahydrofuran is added slowly, with stirring, to 82 ml. of a 2.2 molar solution of allylmagnesium chloride in tetrahydrofuran, while maintaining the reactants under a nitrogen atmosphere. The resulting mixture is stirred at room temperature for a period of about 15 hours, and is then diluted with 200 ml. of a saturated aqueous ammonium chloride solution. The aqueous reaction mixture is extracted with ethyl acetate, and the ethyl acetate extract is washed with water, then with saturated aqueous sodium chloride solution, dried, and evaporated substantially to dryness to give about 31 g. of a yellow oil. This product is subjected to chromatography on silica gel, using benzene as both developing and eluting solvents, to give approximately 10 g. of 3-methoxy-13-ethyl-17α-allyl-gona-1,3,5(10)-triene - 17β-ol, which is recrystallized from methanol to give substantially pure material.

EXAMPLE 10

About 7.95 ml. of redistilled boron trifluoride-etherate is added, with stirring over a thirty-minute period, to a mixture of 38 ml. of anhydrous tetrahydrofuran, 13.3 ml. of 2-methyl-2-butene, and 1.79 g. of sodium borohydride, while maintaining the mixture under a nitrogen atmosphere and at a temperature of about −5° C. The resulting mixture is allowed to stand for an additional 30 minutes at 0° C., and then for a period of about 2.5 hours at 25° C. To this mixture is added quickly a solution of about 6 g. of 3-methoxy-13-ethyl-17-α-allyl-gona-1,3,5-(10)-triene-17β-ol in 25.8 ml. of anhydrous tetrahydrofuran, while maintaining the temperature of the mixture below about −15° C. The mixture is allowed to stand for about 4 hrs. at a temperature of 0.5° C., and then for about 15 hrs. at 25° C. The reaction mixture is cooled to about −15° C.; 19.2 ml. of a 3 N aqueous solution of sodium hydroxide is added (cautiously in view of foaming); the temperature of the mixture is brought to about 0° C.; and 19.2 ml. of a 30% aqueous hydrogen peroxide solution is added over a 20 minute period, while allowing the temperature to rise to about 25–30° C. This mixture is allowed to stand for 1.5 hours at a temperature of about 25° C., and 78 ml. of a 15% aqueous solution of sodium bisulfite is added, followed by 1000 ml. of water. The resulting aqueous mixture is allowed to stand for 3 hours at a temperature of about 0 to 5° C., and is then extracted with 250 ml. of chloroform. The chloroform extract is dried, and the chloroform evaporated to give about 7 g. of crude material. This crude material is subjected to chromatography on silica gel utilizing benzene as the developing solvent, and benzene and benzene-chloroform mixtures containing from 10% to 40% chloroform as the eluting solvents, to give approximately 2 g. of substantially pure 3-methoxy-13-ethyl-17α(γ-hydroxypropyl)-gona-1,3,5(10)-triene-17β-ol; M.P. 170–171° C.

EXAMPLE 11

About 2 g. of p-toluene-sulfonyl chloride is added, with stirring, to a solution containing about 2 g. of 3-methoxy - 13 - ethyl - 17α(γ - hydroxypropyl)-gona - 1,3,5 (10)-triene-17β-ol dissolved in 20 ml. of pyridine, while maintaining the temperature of the resulting mixture at about 0° C. The mixture is then stirred at a temperature of about 25° C. for a period of about 15 hours. Water is added to the reaction mixture, and the crystalline material which separates is recovered by filtration, dissolved in ether, and the ether solution dried over anhydrous sodium sulfate. The ether solution is then evaporated to dryness, and the residual material is recrystallized, first from hexane, and then from methanol, to give approximately 1.5 g. of substantially pure 3-methoxy-18-methyl-19-nor-spiroxa-1,3,5(10)-triene; M.P. 112–113° C.

EXAMPLE 12

About 113 ml. of anhydrous ammonia is added, with stirring, to a mixture of 1.5 g. of 3-methoxy-18- methyl-19-nor-spiroxa-1,3,5(10)-triene, 40 ml. of tertiary butanol and 113 ml. of ether, and the resulting mixture is allowed to warm to reflux temperature. Lithium metal is then added portionwise over a ten-hour period to the refluxing mixture, a quantity being added to impart a deep blue color to said mixture; the mixture is kept at reflux temperature for a period of about 5–6 hours, while continuing to add lithium in amount sufficient to maintain the blue color of the reaction mixture. About 27 ml. of methanol is then added, and the mixture is allowed to evaporate at room temperature for a period of about 15 hours. About 150 ml. of water is added, and the aqueous mixture is extracted with two 150 ml.-portions of ether. The ether extract is washed with three 50 ml.-portions of saturated aqueous sodium chloride solution, the ether is evaporated, and the residual material is recrystallized from methanol to give about 2.0 g. of 3-methoxy-18-methyl-19-nor-spiroxa-2,5(10)-diene; M.P. 140–142° C.

EXAMPLE 13

A solution of 30 g. of oxalic acid in 350 ml. of water is added to a solution containing about 23.0 g. of 3-methoxy-18-methyl-19-nor-spiroxa-2,5(10)-diene in 1735 ml. of methanol. The mixture is allowed to stand at a temperature of about 25° C. for a period of approximately 40 minutes. Excess oxalic acid is neutralized by adding 10% aqueous potassium bicarbonate solution until the reaction mixture is slightly basic; the mixture is then diluted with an approximately equal volume of water, and the aqueous mixture extracted with ethyl acetate. The ethyl acetate extract is washed with 10% aqueous potassium bicarbonate, then with water, dried, and the ethyl acetate evaporated. The residual material is recrystallized from a mixture of equal parts of ether and petroleum ether, and is further purified by chromatography on silica gel to give substantially pure 18-methyl-19-nor-spiroxa-5(10)-ene-3-one.

EXAMPLE 14

A solution of 1 g. of 3-methoxy-18-methyl-19-nor-20-spiroxa-2,5(10)-diene in 25 ml. of ethanol containing about 6 ml. of 2.5 N aqueous hydrochloric acid is heated at reflux temperature for a period of about 15 minutes. The reaction mixture is cooled, diluted with 50 ml. of water, neutralized with solid sodium bicarbonate, and the ethanol evaporated. The aqueous mixture is then extracted with ether; the ethereal extract is washed with water, dried, and evaporated. The residual material is dissolved in petroleum ether containing a small amount of benzene. This solution is subjected to chromatography on an alkaline alumina column, using petroleum ether as the developing solvent, and petroleum ether and petroleum ether:ether mixtures as the eluting solvents, to give substantially pure 18-methyl-19-nor-20-spirox-4-ene-3-one.

EXAMPLE 15

To a solution of about 500 mg. of 18-methyl-19-nor-20-spirox-4-ene-3-one and 1 ml. of trimethyl orthoformate in 10 ml. of anhydrous methanol, cooled to about 0° C., is added 50 mg. of 2,4-dinitrobenzenesulfonic acid. The reaction mixture is maintained at about 0° C. for a period of about 5 minutes. A small amount of pyridine is added and then, dropwise at room temperature, about 20 ml. of water. The material which separates is recovered by filtration, washed well with water, dried, and recrystallized from petroleum ether to give 3-methoxy-18-methyl-19-nor-spiroxa-3,5-diene.

This 3-methoxy-18-methyl-19-nor-spiroxa-3,5-diene is dissolved in a mixture of 12 ml. of isopropanol containing about 10% water. About 1.1 g. of chloranil is added, and the resulting mixture is stirred at room temperature for a period of about 2.5 hours. The reaction mixture is cooled and filtered, thereby removing undissolved, unreacted chloranil. The insoluble material is washed with isopropanol, and the combined filtrate and washings are evaporated to dryness. The residual material is dissolved in ether, and the ether solution is extracted first with aqueous sodium bisulfite solution, then with dilute aqueous sodium hydroxide solution, and finally with water. The ether solution is then evaporated to a volume of 5 ml., and the concentrated ether solution is subjected to chromatography on acid-washed alumina previously wet-packed with petroleum ether. The column is eluted with ether, the ether eluate is evaporated to dryness, and the residual material is recrystallized from hexane containing a small amount of ethyl acetate to give 18-methyl-19-nor-20-spiroxa-4,6-diene-3-one.

Approximately 90 mg. of magnesium turnings in 10 ml. of ether is brought into contact, with stirring under a nitrogen atmosphere, with excess methyl iodide in 2 ml. of ether to form an ether solution of methyl magnesium iodide. About 4 ml. of ether is distilled from the reaction mixture to remove unreacted methyl iodide; about 46 mg. of dry cuprous chloride is then added, and the mixture is cooled with stirring to about 0° C. and maintained at that temperature for a 10 minute period. To the resulting mixture of cuprous-chloride and ether solution of methyl magnesium iodide is added, with stirring for a period of about two hours, a solution of about 400 mg. of 18-methyl-19-nor-20-spirox-4,6-diene-3-one in 7.5 ml. of ether. This mixture is stirred for an additional 30 minute period, and saturated aqueous ammonium chloride solution is added thereto. The aqueous mixture is diluted with 10 ml. of water and 10 ml. of ether, and the aqueous layer is discarded. The ether layer is washed with water, dried, and the ether evaporated. The residual material is dissolved in 2.5 ml. of ethanol, admixed with about 0.25 ml. of 2.5 N aqueous hydrochloric acid solution, and the mixture heated under reflux for a period of about 10 minutes. The ethanolic reaction mixture of cooled, diluted with about 10 ml. of water, and excess sodium bicarbonate solution is added. The aqueous alkaline solution is extracted with two 10 ml.-portions of a 1:1 mixture of ether-petroleum ether. The extracts are combined and evaporated in vacuo, and the residual material is dissolved in about 1.5 ml. hexane containing sufficient benzene to effect solution. The resulting solution is chromatographed on alkaline alumina, using mixtures of petroleum ether and ether as eluting solvents, to give about 160 mg. of crude material which may be purified by recrystallization from methanol to give substantially pure 7α,18-dimethyl-19-nor-20-spirox-4-ene-3-one.

EXAMPLE 16

A mixture of about 1 g. of 7α,18-dimethyl-19-nor-20-spirox-4-ene-3-one, 25 ml. of dry benzene, 5 ml. of ethylene glycol, and 50 mg. of p-toluene sulfonic acid monohydrate is heated under reflux for a period of about 16 hours using a water separator. The reaction mixture is washed with aqueous sodium bicarbonate solution, then with water, dried, and the benzene evaporated therefrom. The residual material is subjected to chromatography on alumina, utilizing petroleum ether:benzene and pure benzene as eluting solvents, to give 3-ethylenedioxy-7α,18-dimethyl-19-nor-20-spirox-5(10)-ene.

EXAMPLE 17

A solution of about 1 g. of 3-ethylenedioxy-7α,18-dimethyl-19-nor-20-spirox-5(10)-ene in 25 ml. of a 9:1 acetone-water mixture is acidified with 0.5 g. of oxalic acid, and the resulting mixture is stirred for about 3 hours at room temperature. The reaction mixture is diluted with water, the aqueous mixture is extracted with ether, and the ether extract is washed with aqueous sodium bicarbonate solution, then with water, dried, and evaporated to give 7α,18-dimethyl-19-nor-20-spirox-5(10)-ene-3-one.

To a solution of about 0.2 g. of 7α,18-dimethyl-19-nor-20-spirox-5(10)-ene-3-one in 4 ml. of pyridine is added approximately 1.1 g. of pyridine perbromide hydrobromide. The mixture is stirred at a temperature of about 25° C. for a period of about 7 hours, the reaction mixture is poured into water, and the aqueous mixture extracted with ethyl acetate. The ethyl acetate extract is washed successively with dilute aqueous hydrochloric acid solution, dilute aqueous sodium bicarbonate solution, dried, and the ethyl acetate evaporated therefrom. The residual material is subjected to chromatography on alumina utilizing benzene:ether and pure benzene as eluting solvents to give 7α,18-dimethyl-19-nor-20-spiroxa-4,9(10)-diene-3-one.

EXAMPLE 18

A suspension of about 1 g. of 7α,18-dimethyl-19-nor-20-spiroxa-4,9(10)-diene-3-one in 16 ml. of methanol is cooled to approximately 0° C., about 1 g. of 2,4-dinitrobenzene sulfonic acid and 3.2 ml. of trimethylorthoformate is added, and the mixture is stirred at 0° C. for about 15 minutes, during which the color of the reaction mixture changes from yellow to green to blue. About 0.2 ml. of pyridine is added to quench the reaction, the mixture is diluted with water, and the aqueous mixture is extracted with methylene chloride. The methylene chloride extract is washed with water, dried, and the solvent evaporated to give 3,3-dimethoxy-7α,18-dimethyl-19-nor-20-spiroxa-5(10),9(11)-diene.

To a cold (0° C.) solution of about 1 g. of 3,3-dimethoxy - 7α,18 - dimethyl-19-nor-20-spiroxa-5(10),9(11)-diene dissolved in 65 ml. of methanol, is added a solution of about 1.2 g. of oxalic acid in water, and the resulting mixture is stirred at a temperature of about 25° C. for a period of about 1.5 hours. The reaction mixture is neutralized by the addition of 10% aqueous sodium bicarbonate solution, the resulting mixture is diluted with water, and the aqueous mixture is extracted with ethyl acetate. The ethyl acetate extract is washed with water, dried and evaporated to give about 1 g. of 7α,18-dimethyl-19-nor- 20-spiroxa-5(10),9(11)-diene-3-one.

EXAMPLE 19

About 1 g. of 7α,18-dimethyl-19-nor-20-spiroxa-5(10),9(11)-diene-3-one is dissolved in 100 ml. of benzene. To this solution is added about 1.8 g. of dichlorodicyanobenzoquinone, and the resulting mixture is stirred at a temperature of about 25° C. for a period of approximately 2 hours. The reaction mixture is evaporated, and the residual yellow oil is dissolved in 20% ethyl acetate:80% benzene, and the resulting solution subjected to chromatography on a silica gel column to give 7α,18-dimethyl-19-nor-20-spiroxa-4,9(10),11-triene-3-one.

EXAMPLE 20

To a solution of about 200 mg. of 7α-methyl-19-nor-20-spirox-5(10)-ene-3-one, which may be prepared as described in Example 5 hereinabove, in 4 ml. of pyridine is added 1.1 g. of pyridine perbromide hydrobromide. The mixture is stirred at a temperature of about 25° C. for a period of about 7 hours, the reaction mixture is diluted with water, and the aqueous mixture is extracted with ethyl acetate. The ethyl acetate extract is washed successively with dilute aqueous hydrochloric acid solution, dilute aqueous sodium bicarbonate solution, dried, and the ethyl acetate evaporated therefrom. The residual material is subjected to chromatography on alumina, utilizing benzene:ether and pure benzene as eluting solvents, to give 7α-methyl-19-nor-20-spiroxa-4,9(10)-diene-3-one.

Various changes and modifications may be made in carrying out the present invention without departing from the spirit and scope thereof. Insofar as these changes and modifications are within the purview of the annexed claims, they are to be considered as part of my invention.

What is claimed is:

1. The process which comprises reacting 7α-methyl-20-spirox-4-ene-3-one with dichlorodicyanobenzoquinone to form 7α-methyl-20-spiroxa-1,4-diene-3-one, reacting the latter compound with diphenylmethane and biphenyl-lithium, thereby aromatizing ring A to form 7α-methyl-19-nor-20-spiroxa-1,3,5(10)-triene-3-ol, reacting the latter compound with a methylating agent to form the corresponding 3-methyl ether, reacting said 3-methyl ether with metallic lithium in liquid ammonia solution to form 3-methoxy-7α-methyl-19-nor-20-spiroxa-2,5(10) - diene, reacting the latter compound with oxalic acid in aqueous acetone to form 7α-methyl-19-nor-20-spirox-5(10)-ene-3-one, reacting said 7α-methyl-19-nor20-spirox-5(10)-ene-3-one, or if desired the 3-methoxy-7α-methyl-19-nor-20-spiroxa-2,5(10)-diene, with aqueous mineral acid thereby forming 7α-methyl-19-nor-20-spirox-4-ene-3-one.

2. The process which comprises reacting the 7α-methyl-19-nor-20-spirox-5(10)-ene-3-one with pyridine and bromine thereby forming 7α-methyl-19-nor-20-spirox-4,9(10)-diene-3-one.

3. The process which comprises reacting 3-methoxy-13-ethyl-gona-1,3,5(10)-triene-17-one with allyl magnesium halide to produce a 3-methoxy-13-ethyl-17α-allyl-gona-1,3,5(10)-triene-17β-ol, reacting the latter compound with bis(3-methyl-2-butyl)borohydride to form a trialkyl borane intermediate which is treated with alkaline hydrogen peroxide to form 3-methoxy-13-ethyl-17α-(3'-hydroxypropyl)-gona - 1,3,5(10) - triene-17β-ol, reacting the last-named compound with a dehydrating agent thereby forming 3-methoxy-18-methyl-19-nor-20-spiroxa-1,3,5(10)-triene, reacting said 3-methoxy-18-methyl-19-nor-20-spiroxa-1,3,5(10)-triene with lithium in liquid ammonia to produce 3-methoxy-18-methyl-19-nor-20-spiroxa-2,5(10)-diene, reacting the latter compound with aqueous mineral acid solution to produce 18-methyl-19-nor-20-spirox-4-ene-3-one, reacting this 18-methyl - 19 - nor-20-spirox-4-ene-3-one with an enolizing agent thereby forming 3-methoxy-18-methyl-19-nor-20-spiroxa-3,5-diene, reacting the last-named compound with chloranil to produce 18-methyl-19-nor-20-spiroxa-4,6-diene-3-one, and reacting said 18-methyl-19-nor-20-spirox - 4,6 - diene-3-one with methyl magnesium halide to produce 7α,18-dimethyl-19-nor-20-spirox-4-ene-3-one.

4. The process as defined in claim 3, wherein the 7α,18-dimethyl-19-nor-20-spirox-4-ene-3-one is reacted with ethylene glycol in the presence of an acidic catalyst to form 3-ethylenedioxy - 7α,18 - dimethyl-19-nor-20-spirox-5(10)-ene, reacting the latter compound with oxalic acid in aqueous acetone to form 7α,18-dimethyl-19-nor-20-spirox-5(10)-ene-3-one, and reacting said 7α,18-dimethyl-19-nor-20-spirox-5(10)-ene-3-one with pyridine and bromine to produce 7α,18-dimethyl-19-nor-20-spiroxa-4,9(10)-diene-3-one.

5. The process as defined in claim 3, wherein the 7α,18-dimethyl-19-nor-20-spirox-4-ene-3-one is reacted with ethylene glycol in the presence of an acidic catalyst and the resulting 3-ethylenedioxy derivative reacted with oxalic acid to form 7α,18-dimethyl-19-nor-spirox-5(10)-ene-3-one, reacting the latter compound with pyridine and bromine to form 7α,18-dimethyl-19-nor-20-spiroxa-4,9(10)-diene-3-one, reacting said 7α,18-dimethyl - 19 - nor-20-spiroxa-4,9(10)-diene-3-one with methanol in the presence of an acidic enolizing agent to form 3,3-dimethoxy-7α, 18-dimethyl-19-nor-20-spirox-5(10),9(11)-diene, reacting the latter compound with oxalic acid to form 7α,18-dimethyl-19-nor-20-spiroxa-5(10),9(11)-diene-3-one, and reacting the last-named compound with dichlorodicyanobenzoquinone to form 7α,18-dimethyl-19-nor-20-spiroxa-4,9(10),11-triene-3-one.

6. The 20-spiroxane-3-one having the following formula:

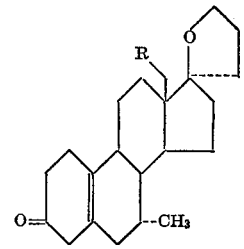

wherein R is methyl.

7. The 20-spiroxane-3-one having the chemical name 7α,18-dimethyl - 19 - nor - 20 - spiroxa-4,9(10),11-triene-3-one.

8. The process which comprises reacting a compound having the formula:

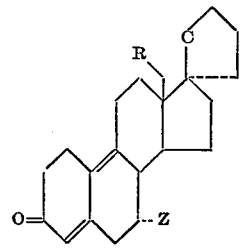

wherein R and Z are hydrogen or methyl, with an enolizing agent in the presence of a lower alkanol to form a 3,3-dialkoxy-20-spiroxa - 5(10),9(11) - diene compound having the formula:

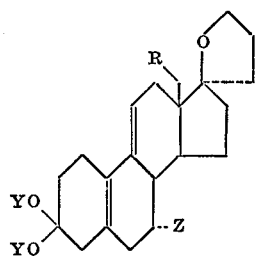

wherein Y is lower alkyl, and R and Z are hydrogen or methyl, reacting the latter compound with oxalic acid to form the corresponding 20-spiroxa-5(10),9(11)-diene-3-one compound, and reacting the latter with dichlorodicyanobenzoquinone to form a compound having the formula:

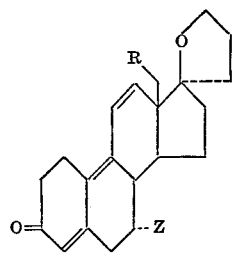

wherein R and Z are hydrogen or methyl.

9. The process as defined in claim 8, which comprises reacting 7α,18 - dimethyl-19-nor-20-spiroxa-5(10),9(11)-diene-3-one with dichlorodicyanobenzoquinone to form 7α,18-dimethyl-19-nor - 20 - spiroxa - 4,9(10),11 - triene-3-one.

10. The process as defined in claim 8, which comprises reacting 19-nor-20-spiroxa-5(10),9(11)-diene-3-one with dichlorodicyanobenzoquinone to form 19-nor-20-spiroxa-4,9(10),11-triene-3-one.

11. The process as defined in claim 8, which comprises reacting 18-methyl-19-nor-20-spiroxa-5(10),9(11)-diene-3-one with dichlorodicyanobenzoquinone to form 18-methyl-19-nor-20-spiroxa-4,9(10),11-triene-3-one.

References Cited
UNITED STATES PATENTS

| | | | |
|---|---|---|---|
| 3,297,686 | 1/1967 | Brown | 260—239.55 |
| 3,364,207 | 1/1968 | Brown | 260—239.55 |
| 3,432,528 | 3/1969 | Anner et al. | 260—397.3 |
| 3,435,055 | 3/1969 | Klimstra | 260—397.3 |
| 3,455,909 | 7/1969 | Foell et al. | 260—239.55 |
| 3,509,135 | 4/1970 | Brown | 260—239.55 |

HENRY A. FRENCH, Primary Examiner

U.S. Cl. X.R.

260—397.4, 397.5, 999